United States Patent [19]

Stol

[11] Patent Number: 4,892,993
[45] Date of Patent: Jan. 9, 1990

[54] WELDING SYSTEM FOR HOLLOW THIN WALLED MEMBERS

[75] Inventor: Isreal Stol, Mt Lebanon, Pa.

[73] Assignee: Aluminum Company of America, Pittsburgh, Pa.

[21] Appl. No.: 196,373

[22] Filed: May 19, 1988

[51] Int. Cl.$^4$ .................................................. B23K 9/32
[52] U.S. Cl. ................................... 219/125.1; 219/136; 219/160; 228/222; 901/42
[58] Field of Search ...................... 219/160, 136, 125.1; 228/222; 901/42

[56] References Cited

U.S. PATENT DOCUMENTS

| | | | |
|---|---|---|---|
| 1,696,455 | 12/1928 | Rupley | 219/160 |
| 1,997,296 | 4/1935 | Free | 219/6 |
| 3,634,648 | 1/1972 | Morris | 219/125.1 |
| 3,745,297 | 7/1973 | Peshina | 219/56 |
| 3,897,898 | 8/1975 | Hirose et al. | 219/125.1 |
| 3,970,232 | 7/1976 | Melton | 228/7 |
| 4,144,439 | 3/1979 | Chang et al. | 219/160 |
| 4,201,326 | 5/1980 | Connell | 228/50 |
| 4,285,458 | 8/1981 | Slavens | 228/49 |
| 4,387,845 | 6/1983 | Mefferd | 228/222 |

Primary Examiner—Clifford C. Shaw
Attorney, Agent, or Firm—Bruce J. Ffitch

[57] ABSTRACT

In a system for welding thin section aluminum castings to elongated sections of thin walled hollow aluminum extrusion, an expandable mandrel specific to the weldment to be assembled serves also as a holder and positioner while welding is in progress. A powered carriage rotatably supports the normally cantilevered mandrel and advances it into position in the bore of the extrusion. Sets of hydraulically powered expansion shoes of the mandrel are spaced along its length so as to register internally with the location of external weld joints between casting and extrusion. Selective independent actuation of shoes or sets of shoes applies outward pressure locally to remove distortions in the "as received" extrusion, so as to maintain consistent fit up between extrusion and casting, facilitating consistently good welded joints. This mechanical positioning and form control system lends itself readily to integration with robot welders for fully automated operation.

32 Claims, 3 Drawing Sheets

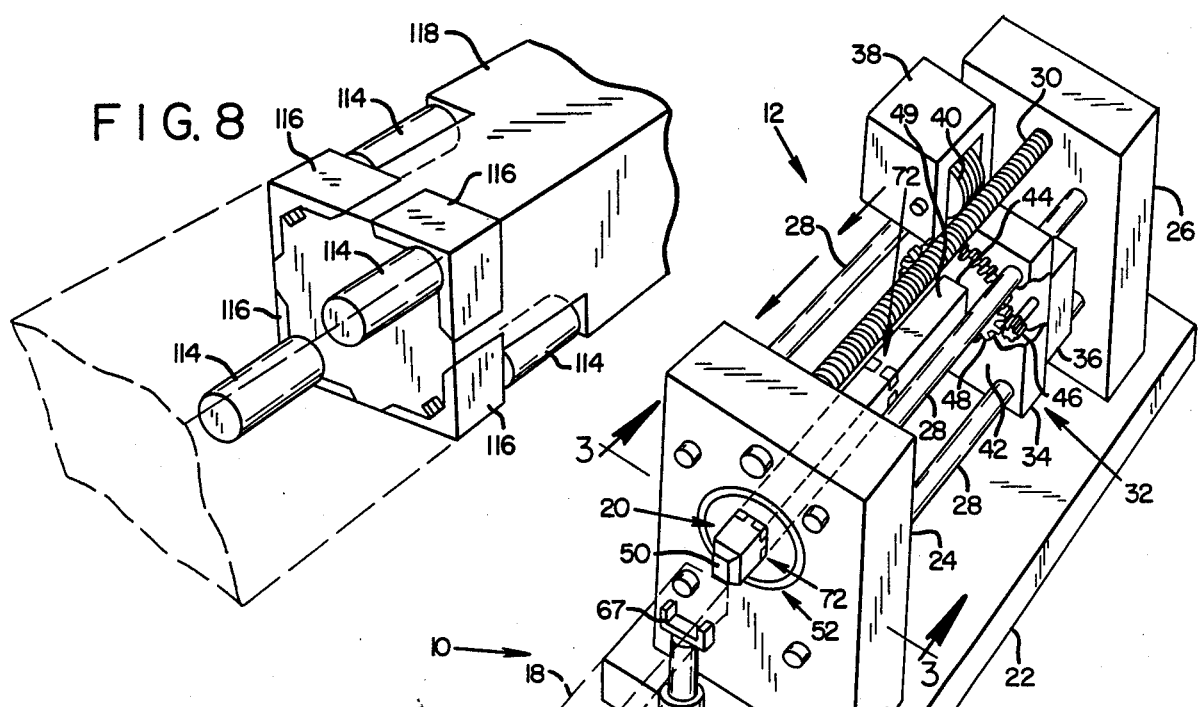
FIG. 8
FIG. 1
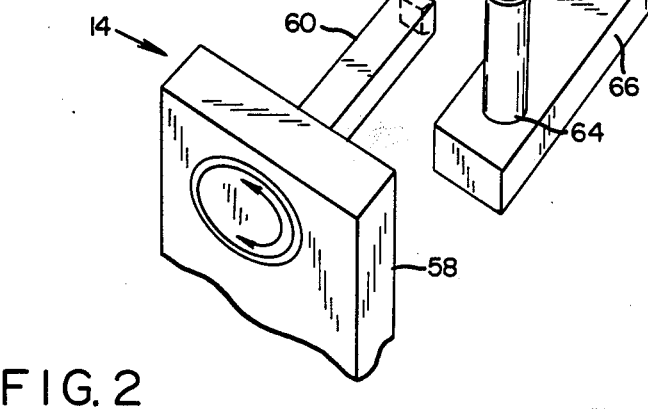
FIG. 2

WELDING SYSTEM FOR HOLLOW THIN WALLED MEMBERS

BACKGROUND OF THE INVENTION

This invention concerns the making of welded joints between thin sections of light metals such as aluminum and, more particularly, to the welding of attachments such as mounting brackets of thin section to external surfaces of hollow thin walled elongated members, such as lengths of thin walled aluminum extrusions.

Modern stress analysis techniques, materials, and advances in foundry and welding processes make feasible the production of structures which are very efficient in terms of strength to weight ratio. Such structures are commercially attractive especially for aircraft and automobiles where fuel economy (coupled with generous payload) remains an important goal.

It is characteristic of these efficient structures that frame members may have very thin walls and mating or attaching members including castings may be of very thin section. For example, it is sometimes desirable to join by welding a casting with section thickness at the welded joint of two to three millimeters to an aluminum extrusion with a wall thickness of less than two millimeters.

Successful execution of welded joints in structures of this nature depends in large part on dimensional and form control so as to ensure minimum variation in fit-up at the proposed welded joints. Cost considerations require the use in assembly of hollow sections such as aluminum extrusions with quite wide manufacturing variations in general shape of cross section and in particulars such as straightness of walls in the cross section. If there are significant variations in fit-up at the proposed joint, highly skilled welders, able to compensate for these variations, must be used to achieve production welds of acceptable quality and tolerable levels of scrap and repair costs. Where there is inconsistent contact between the faying surfaces at the weld joint, catastrophic burn through and/or melt through is common. And even with gas metal arc (GMA) welding such joints are unforgiving to changes in welding conditions (for example, welding current, wire feed rate, speed of travel and heat accumulation in the extrusion). It is difficult to maintain control over weld penetration and bead shape and welding rate tends to be slow. On the other hand, predictable consistency in contact between the faying surfaces of a proposed joint is less demanding of welding technique and lower grade operators may be used; and automatic or robotic execution of welding such joints becomes more economically feasible.

SUMMARY OF THE INVENTION

Accordingly, an object of this invention is to provide cost effective means of producing consistently, in quantity production, high quality weld joints between thin walled hollow members, such as aluminum extrusions, and externally surface attached fittings such as mounting or connecting brackets which may be in the form of aluminum castings.

A further object of this invention is to provide a handling means for fabricating weldments of the type described, that facilitates manipulation of the weldment so that, for example, welds may be made in a desired position, such as down hand, and also continuous if appropriate.

These objects are realized in the structural and functional integration of a rotating positioner and a special expandable mandrel. The mandrel may be mounted on a carriage for powered insertion, possibly automatically, once the hollow member has been positioned. Powered expansion of the mandrel engages the inside walls of the hollow member and biases it towards its predetermined cross sectional shape so as to bring gaps between the faying surfaces of the castings, or other parts to be attached, and the outer walls of the hollow member to within desired limits.

Preferably, the expandability of the mandrel is achieved through actuation of a series of sets of shoes selectively placed so as to back up each welded joint. Preferably, each shoe or set of shoes is independently actuated so that all shoes are free to exert their predetermined pressure in spite of local dimensional variations along the length of the hollow member. Once expanded, the mandrel, securely holding the weldment, may be rotationally manipulated to position the joints conveniently for the best welding bead control. The mandrel thus performs the triple duty of shaping, holding, and positioning. Welding robots may be interfaced and integrated with the mandrel positioning system and the system set up so that all welds will be executed in a preferred position.

In a preferred embodiment of the mandrel, each shoe may be actuated by a linear actuator such as a hydraulic cylinder with its line of action parallel to the longitudinal axis of the mandrel. The generally radially outward motion of the shoe is obtained by translating the linear motion of the hydraulic cylinder rod, using a wedge-like member between the rod and the shoe. Although each shoe straddles the line of weld, positioning of their actuators may be staggered to facilitate maintaining the structural integrity of the mandrel frame or body.

During welding, the weld backing shoes of the mandrel are in intimate contact with the inside wall surfaces of the hollow member or extrusion and their presence provides, locally, an extra "heat sinking" capacity. The welding system thus minimises catastrophic burn through and/or melt through of the walls of the hollow member and provides extra forgiveness to changes in welding conditions, such as welding current, wire feed rate, etc. The backing of the shoes helps control of weld penetration and bead shape and makes it more feasible to weld over and into extrusions of less than two millimeters wall thickness. Higher deposition rates are possible and larger fillet welds can be made.

Another advantage of a welding system according to the invention is that the expanded mandrel becomes in effect a fixture that not only corrects distortion before welding but prevents or reduces it during welding. The system also makes more feasible deposition of circumferentially continuous fillet welds into and around hollow members, minimizing the formation of fatigue-sensitive and/or crevice corrosion-sensitive sites.

Other features and advantages of the invention will become apparent from the drawings and description which follow:

BRIEF DESCRIPTION OF THE DRAWINGS

FIG. 1 is a semi-schematic three quarters overhead perspective view of a welding station embodying the invention.

FIG. 2 is a semi-schematic side view of the welding station.

FIG. 8 is a diagrammatic perspective view showing a staggered arrangement for the actuators for one set of shoes of the mandrel.

DESCRIPTION OF THE PREFERRED EMBODIMENT

Figure 3:
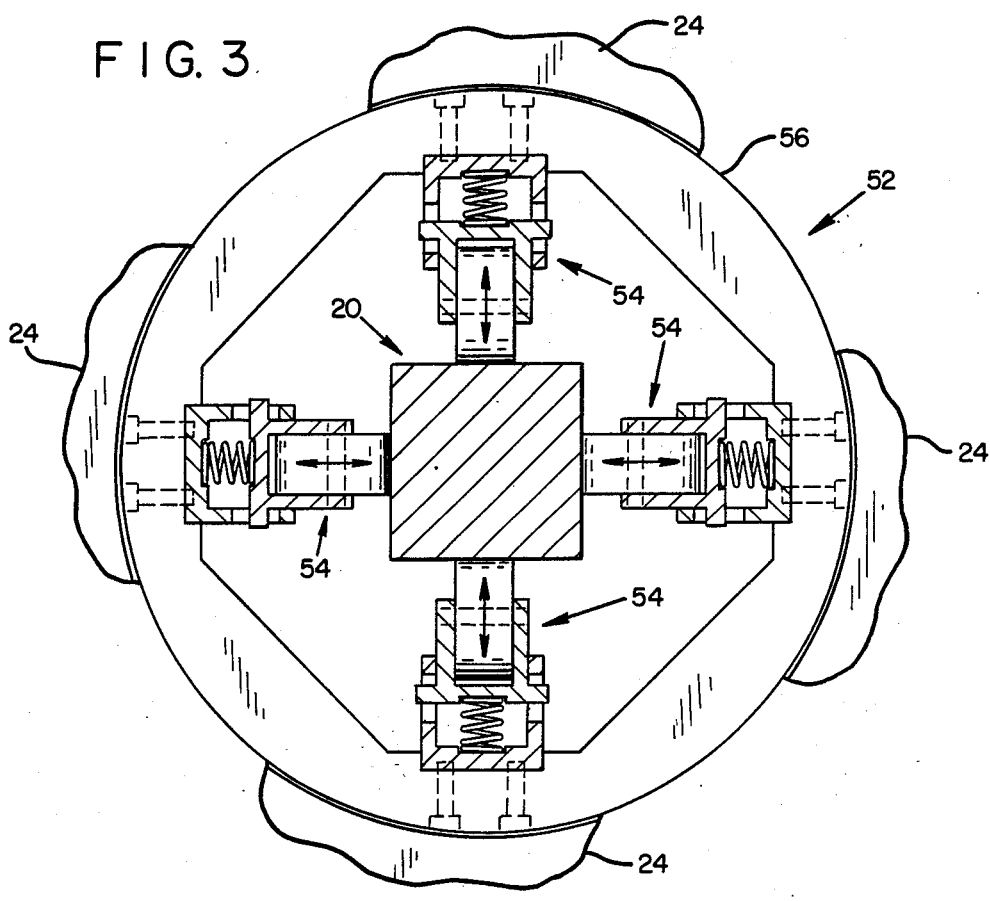
FIG. 3 is an enlarged partial view taken approximately on line 3—3 of FIG. 1 showing a guide arrangement for a mandrel of the invention.

The invention is embodied in the welding station 10 shown in FIG. 1 and consisting of a welding station main assembly 12, an end support assembly 14, and a workpiece support assembly 16. A hollow rectangular workpiece 18 such as an aluminum extrusion is shown in phantom outline in position on the support assembly 16. An expandable mandrel 20 supported and manipulated by the main assembly 12 is shown in FIG. 1 in a retracted position.

In the welding station main assembly 12 a base 22 supports front and rear upright columns 24 and 26 respectively. Four horizontal guide rails 28 extend between the columns. Somewhat above the guide rails a horizontal lead screw 30 extends between the columns. A mandrel carriage assembly 32 includes a carriage body 34 which is supported for sliding horizontal movement by the rails 28. Carried on the rear side of the carriage body is an electrohydraulic power unit and control assembly 36. A nut drive sub assembly 38 attached to an upper portion of the carriage body 34, includes a power driven "nut" 40, engaging the lead screw 30.

Opening from the front face 42 of the carriage body 34 is a mandrel holder 44, for receiving an end 49 of the mandrel 20. The mandrel holder 44 is rotatable for rotating the mandrel 20 about its longitudinal axis and is powered from the control and power unit 36 through the medium of pinion 46 and crown wheel 48 and other drive elements not shown in the drawings.

Powered rotation of the nut 40, engaged with the lead screw 30, propels the mandrel carriage assembly 32 and hence the rear end 49 of the mandrel horizontally in either direction as required, supported by the guide rails 28.

When in the retracted position, as shown in FIG. 1, the front end or mandrel nose 50 is supported and guided in the front column 24 by the mandrel guide arrangement 52. Two pairs of spring loaded rollers 54, (see FIG. 3), center the mandrel 20 in a frame 56 which is free to rotate in the front column 24.

Referring again to FIG. 1, in the upright column 58 of the end support assembly 14, a mandrel support bar 60 is journaled for free rotation coaxially with the mandrel 20. A socket 62 in the end of the support bar 60 is shaped to receive and support the mandrel nose 50.

The workpiece support assembly 16 consists of two telescopically adjustable upright supports 64, carried on a base 66. At its top, each support leg 64 carries a workpiece support cradle 67, into which the workpiece may be clamped by suitable means such as manipulation of clamp screw 68 (shown only in FIG. 1).

Figure 5:
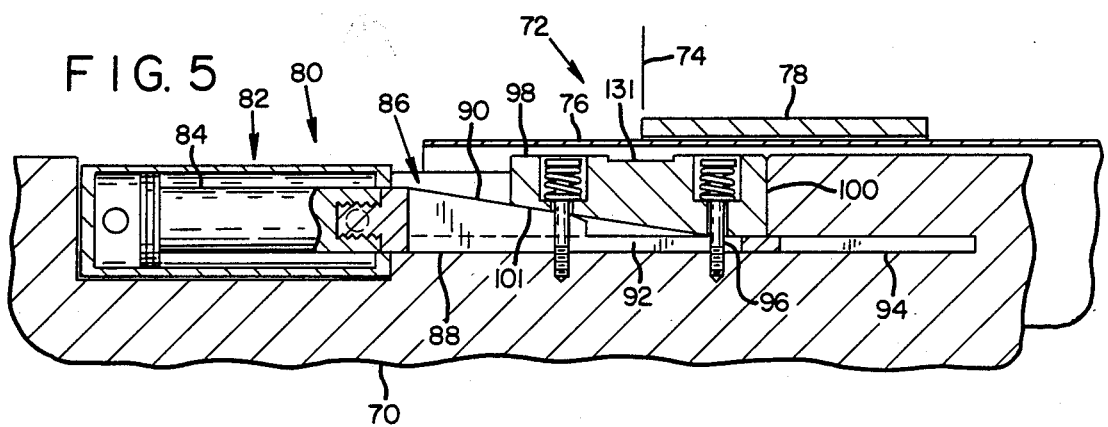
FIG. 5 is an enlarged partial, longitudinal section of the mandrel showing a shoe and its actuator taken on the longitudinal center line of the shoe and actuator.
Figure 6:
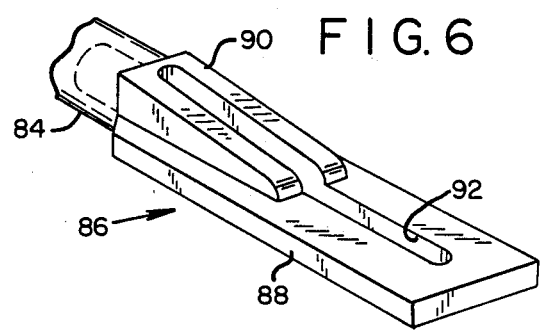
FIG. 6 is a perspective view of the wedge portion of one of the shoe actuators.
Figure 4:
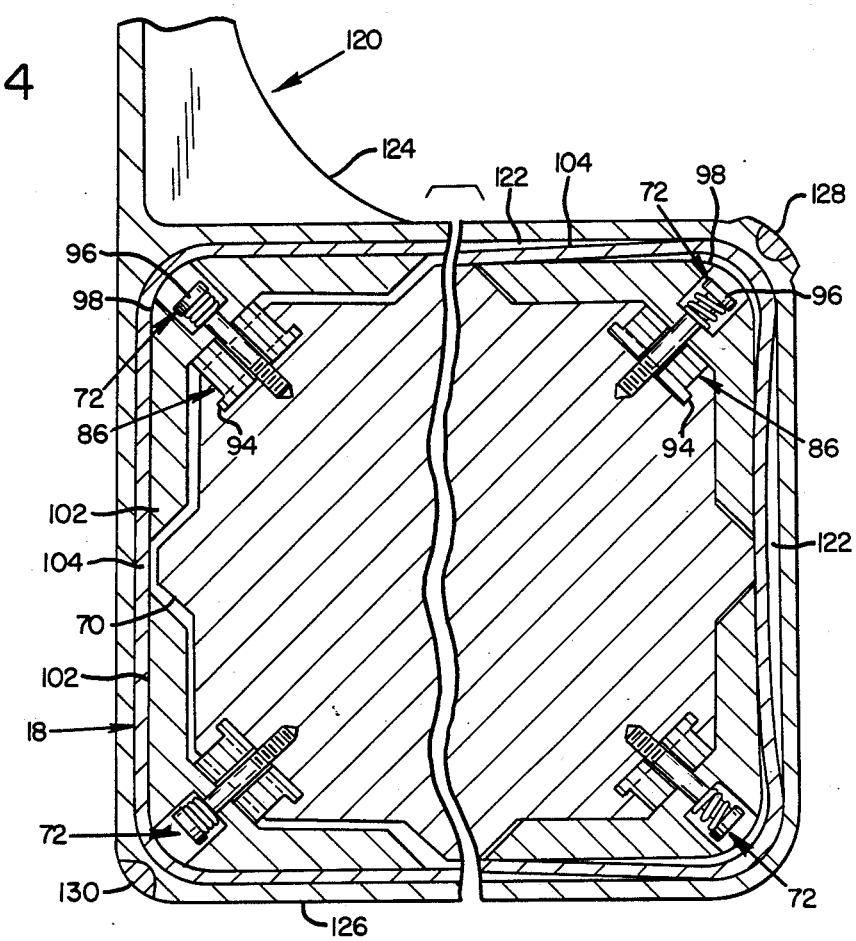
FIG. 4 is an enlarged cross sectional view of the mandrel in position in a weldment, taken on line 4—4 of FIG. 2. This view is split to show joint condition before and after actuation of the mandrel shoes.

More detail of the mandrel assembly 20 is shown in FIGS. 4, 5 and 6. The main frame or body 70 of the mandrel is shown in the drawings as a solid bar but it might also be a fabricated "skeleton" to reduce its weight. The mandrel shown is of generally square cross section to be compatible with the exemplary workpiece 18 which is shown as a hollow extrusion of square cross-section. At predetermined intervals along the length of the mandrel 20 are sets of shoe assemblies 72, located as appropriate for the one or more weldments for which the mandrel is designed. In the typical cross section shown in FIG. 4, four shoe assemblies 72 are arranged in transverse alignment to register with the plane 74 of the joint to be welded (see FIG. 5) - in this case, the joint between workpiece wall 76 and casting 78.

Each shoe assembly 72 is actuated by a separate actuator assembly 80. And, each set or combination of shoe and actuator assemblies is set in a recess of the mandrel body 70 so that normally no parts of these assemblies project beyond the periphery of the mandrel body. Each actuator assembly 80 includes a double acting hydraulic cylinder 82, including a cylinder rod 84. Screwed into the end of each rod 84 is a wedge member 86 which includes a flanged base 88 and a ramp or wedge portion 90, and a central elongated slot 92 (see FIG. 6.) In actuator operation, the edges of the flanged base 88 are guided by slots 94 in the mandrel body 70. Spring loaded retainers 96 passing through slot 92, and anchored in the mandrel body 70, maintain the shoe 98 in an essentially fixed position longitudinally, abutting against a stop face 100 of the mandrel body 70 and urged and held down on the wedge member 86 by the retainers 96. The underside 101 of the shoe 98 is sloped at the same angle as the wedge portion 90, so that operation of the actuator assembly 80 causes the shoe 98 to move generally radially inwards or outwards due to the wedging action between the surfaces of the wedge portion 90 and the sloping underside 101 of the shoe 98. The sides or wings 102 of neighboring shoes 98 together almost completely span a side wall 104 of the extrusion workpiece (FIG. 4).

Figure 7:
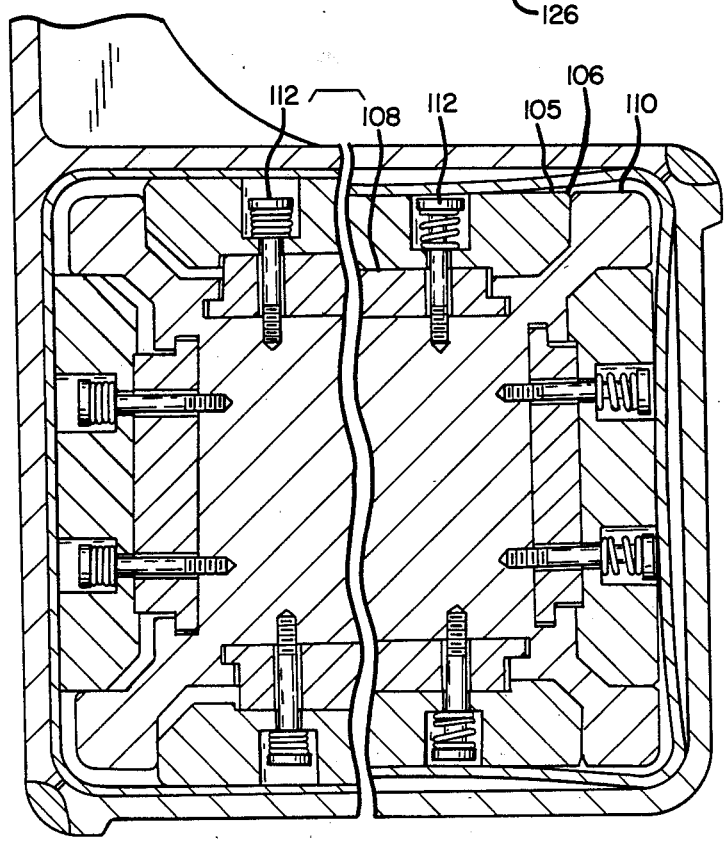
FIG. 7 is a view similar to FIG. 4 including a second embodiment of the mandrel of the invention.

FIG. 7 shows another mandrel shoe configuration which may be appropriate for some welded assemblies. Here the portion of the shoe contacting the inside walls of the extrusion is a simple plane surface 105. The principle of operation is the same as that of FIG. 4. A wedge member 108 driven by an actuator (not shown) interacts with the shoe 106. Again the shoe is normally retracted against the mandrel body by spring retractors 112.

FIG. 8 shows a staggered arrangement of actuators. The four actuators 114 are arranged in diagonally opposite pairs on opposite sides of the set of shoes 116. This arrangement minimizes the reduction of section modulus of the mandrel body 118, resulting from the recessing of the shoe and actuator assemblies.

OPERATION

In typical operation, the mandrel 20 appropriate to the welded assembly to be run is installed as indicated in FIG. 1, with the carriage assembly 32 retracted and the nose 50 of the mandrel supported by the mandrel guide 52. The hollow member forming the basis or core of the welded assembly, such as extrusion section 18, is clamped in position on the workpiece support assembly 16. The electrohydraulic system 36 is actuated to drive the nut 40, engaged with lead screw 30, so that the mandrel carriage 32 advances along the guide rails 28 towards the front column 24. During this motion the tapered nose 50 of the mandrel enters the bore of the hollow workpiece 18 and passes through it. The resilient members 54 of the mandrel guide 52 accommodate any minor misalignments encountered in the course of this operation. The mandrel nose 50 finally encounters the end socket 62 of the mandrel support bar 60. The shapes of the mandrel nose 50 and the receiving socket 62 mate so that the mandrel is held coaxial with the axes of rotation of the mandrel holder 44 in the mandrel carriage 32 and the mandrel support bar 60 in the support column 58. The workpiece 18 is now unclamped and the workpiece telescopic supports 64 are retracted to be clear of the weldment.

Next, the components to be welded to the workpiece 18 are positioned on the workpiece either by clamping or tack welding. A typical component to be welded is the cast bracket 120 shown at least partially in FIG. 4. Next, the mandrel 20 is actuated to expand the shoes 98 outwards to engage the workpiece walls 104 with sufficient pressure to remove distortion and restore the extrusion cross section to its predetermined shape - in this case a simple rectangle. Typical gaps 122 which may exist between the extrusion walls 104 and the casting, because of distortion in the extrusion as received, are indicated in FIG. 4.

A casting 120 fully encircling the extrusion 18, as shown in FIG. 4, may itself be distorted to such an extent that straightening of the extrusion alone is not sufficient to obtain good welding contact around the joint. In this case the casting may be split along its diagonal corners and the upper and lower halves 124, 126 fitted snugly on the workpiece 18. The casting is then re-welded at the corners 128, 130, before stretching the extrusion into place using the expandable mandrel 20.

The expandable mandrel 20 according to the invention forces the weld backing shoes 98 outwards, and this ensures consistent contact between the faying surfaces of the components to be welded and the surface of the hollow extrusion or workpiece before and during welding. The extra heat sinking capacity of the weld backing shoes 98 and their intimate contact with the inside walls 104 of the extrusion walls minimize catastrophic burn through and/or melt through of the extrusion walls, and also provides forgiveness to changes in welding conditions, such as welding current or wire feed rate, etc. Control over weld penetration and bead shape is improved so that very thin members may be successfully welded at acceptable deposition rates, and with adequate fillet size.

Once the mandrel 20 has been expanded inside the extrusion workpiece 18, the mandrel 20 and the extrusion 18 become in effect a rigid assembly and distortion during welding is minimized. Shoe pressure should be sufficient not only to correct shape defects such as parallelogramming but also to straighten bowed walls. Pressures may even be sufficient to permanently set the extrusion in the straightened condition. Independent operation for each set of shoes or an individual shoe, permits each shoe to exert its designed force locally on the inside of the extrusion, regardless of "defects" in the as received condition of extrusion such as lack of straightness and other deformities.

Transverse grooves 131 of the shoes 98 which register with the plane of weld (74 in FIG. 5) avoid the problem of "suckback". This is the concavity which may result on the inside face of the extrusion at the weld if, during welding, that face is in contact with a cooling surface.

If welding is manual, the weldment may be manipulated by means of the electrohydraulic control system 36 to position it so that each weld is downhand. The mandrel 20 with power and control unit 36 thus fulfills its third function as a positioner or manipulator as well as being a shaper and a holder.

The system is readily adaptable to robotic operation as indicated in much simplified schematic in FIG. 2. Robot welders 132 carrying welding torches or guns 134, may be interfaced and integrated through a controller 136 with the mandrel positioning mechanism (electrohydraulic power and control system 36), to fully automate the system. Such automation, along with the benefits of consistent fit up rendered by the expandable mandrel, facilitate execution of continuous fillet welds, helping to minimize the formation of fatigue and/or crevice corrosion sensitive sites in the finished weldment.

In the operation described, the mandrel 20 has been supported at both ends, as a beam, but virtually all the advantages of the system are available with a cantilevered mandrel (that is without an end support such as support assembly 14), when shortness and stiffness of the assembly permits.

The extrusion forming the core or basic frame member of a typical weldment may have a cross section of three inches by four inches and be two to three feet long. But clearly the invention is adaptable to a wide range of sizes of extrusion or hollow member, and to types of component to be welded to it.

Welding systems according to the invention may be used particularly advantageously and dependably with GMA (gas metal arc) or GTA (gas tungsten arc) welding processes, especially robotics, when supported by suitable power supply, wire feeders, etc.

While the invention has been described in conjunction with several specific embodiments, it is to be understood that many alternatives, modifications and variations will be apparent to those skilled in the art in light of the aforegoing description. Accordingly, this invention is intended to embrace all such alternatives, modifications, and variations which fall within the spirit and scope of the appended claims.

We claim:

1. A system for facilitating the welding of a thin walled attachment to outside surfaces of a thin walled hollow member at a plurality of welded joints, said member having an elongated cavity defined by a plurality of elongated internal wall surfaces and having at least one open end, comprising:
    (a) a mandrel carrier for receiving and supporting an end of a mandrel, the carrier being supported for movement in a longitudinal direction;
    (b) means for supporting the hollow member so that its elongated cavity extends in the longitudinal direction;
    (c) an elongated expandable mandrel supported at one end by the carrier in substantially cantilever fashion and extending in the longitudinal direction and having a free end opposite from the supported end: and
    (d) means for advancing the carrier with the mandrel in the longitudinal direction so that the free end of the mandrel passes through the at least one open end and enters the cavity of the thin walled hollow member.

2. The system of claim 1 wherein the mandrel carrier includes means for rotating the mandrel about a longitudinal axis.

3. The system of claim 2 and further including control means for controlling the rotation of the mandrel so that all joints between the attachment and the thin walled hollow member may be welded with the joints extending substantially parallel to a predetermined plane.

4. The system of claim 3 wherein the control means includes automatic means for completing a first weld at a first joint, and for rotationally manipulating the mandrel so that, in preparation for a second weld at a second joint, the mandrel is rotationally positioned with the second joint extending approximately parallel to the predetermined plane.

5. The system of claim 1 and including guide means longitudinally spaced from the carrier for maintaining the alignment of the free end of the mandrel as the carrier advances.

6. The system of claim 5 wherein the guide means includes resilient members for accommodating minor deflections of the mandrel from the longitudinal direction.

7. The system of claim 1 wherein the cavity has opposite open ends and, in operation, the free end of the mandrel passes through the cavity and including an end support for engaging the free end of the mandrel and providing additional support for the mandrel so as to support its extension in the longitudinal direction.

8. The system of claim 7 wherein the engagement of the free end of the mandrel with the end support permits rotation of the mandrel about its longitudinal axis.

9. The system of claim 1 wherein the mandrel carries a plurality of shoes and including means for biasing the shoes away from the longitudinal axis of the mandrel, for engaging the internal wall surfaces of the cavity and biasing the hollow member so that a predetermined cross sectional shape of said member is attained.

10. The system of claim 9 wherein at least one of the plurality of mandrel shoes is disposed adjacent a specific welded joint so that the biasing of said at least one shoe may modify the cross sectional shape of the hollow member adjacent said specific joint.

11. The system of claim 10 wherein the at least one shoe overlaps the specific welded joint and including an external groove in said shoe so that the shoe makes contact with the internal wall surfaces only on opposite sides of the joint.

12. The system of claim 9 wherein the means for biasing includes means for biasing at least one of the shoes independently of the other shoes.

13. A method for facilitating the welding of an attachment to an external wall surface of a thin walled tubular member, said member having a plurality of longitudinally extending walls including at least one planar wall, said walls defining a bore having a first cross sectional shape, and the attachment having an internal profile for at least partially surrounding the tubular member and including faying surfaces disposed to register with and closely approach corresponding faying surfaces of the tubular member when said member is in a second cross sectional shape, said registering faying surfaces having a boundary defining a generally circumferentially extending joint line, said method comprising the steps of:
(a) positioning the attachment on the tubular member so as to establish the joint line;
(b) inserting a mandrel having an expandable shoe into the bore of the tubular member;
(c) positioning the mandrel so that the expandable shoe approximately registers with the joint line; and
(d) actuating the expandable shoe so that it applies internal pressure to the tubular member adjacent the joint line, and biases the tubular member into the second cross sectional shape, so that the respective faying surfaces are brought into close proximity in preparation for welding.

14. An expandable mandrel for insertion in an elongated thin walled hollow member for maintaining a predetermined cross sectional shape at selected axially spaced stations of the member during external operations on the member at those stations, the member having a longitudinally extending bore defined by a plurality of longitudinally extending internal wall surfaces, and internal corners intermediate said wall surfaces, comprising:
(a) a frame having a longitudinal mandrel axis;
(b) a plurality of shoe assemblies carried by the frame and axially spaced so that after insertion of the mandrel in the bore of a tubular member, at least some of the shoe assemblies register with corresponding stations of the tubular member, each shoe assembly including a shoe shaped to conform to a portion of the inside surface of the bore of the tubular member, and having a contacting surface for engaging said portion; and
(c) actuating means for each shoe assembly operable to bias each shoe outwards independently with respect to the mandrel axis, so as to contact an inner surface of the bore and maintain the predetermined cross sectional shape of the tubular member, at the corresponding station.

15. The mandrel of claim 14 wherein the actuating means for at least one of the shoes includes a linear actuator having a line of action approximately parallel to the longitudinal axis of the mandrel and disposed closely adjacent said one of the shoes.

16. The mandrel of claim 15 wherein the linear actuator comprises a double acting hydraulic cylinder.

17. The mandrel of claim 15 wherein the means for biasing the shoe includes a wedge member operably associated with the linear actuator for biasing the shoe outwards responsive to axial movement of the wedge member.

18. The mandrel of claim 15 and including resilient means in the shoe assembly effective between the shoe and the mandrel frame to urge the shoe inwards towards the mandrel axis.

19. The mandrel of claim 15 and including, at a given axial position of the mandrel, a plurality of shoe assemblies wherein in each shoe assembly a linear actuator extends axially away from the shoe, and wherein at least a pair of such linear actuators extend in mutually opposing axial directions.

20. The mandrel of claim 14 wherein at a given station the shoes are disposed and shaped to engage the internal corners of the bore of the tubular member.

21. The mandrel of claim 14 wherein at a given station the shoes are disposed and shaped to engage internal surfaces of the bore intermediate the corners.

22. The mandrel of claim 14 wherein the contacting surface of each shoe includes a broad groove extending generally transverse the longitudinal axis of the mandrel.

23. A weldment holder and manipulator for facilitating the welding of attachments externally on an elongated tubular member comprising:
  (a) a carriage supported for horizontal movement in a longitudinal direction and supported at least partially by a first upright fixed support;
  (b) mandrel holding means included in the carriage for supporting a mandrel cantilever fashion and extending in the longitudinal direction so that the mandrel has a free end and is adapted to support a weldment threaded over it for at least partial rotation about a longitudinal axis, so as to selectively position the weldment for welding; and
  (c) power means for propelling the carriage in the longitudinal direction selectively away from and towards the first support.

24. The weldment holder and manipulator of claim 23 and including guide means carried by a second upright fixed support longitudinally spaced from the first support for providing additional support for the free end of the mandrel, and wherein the mandrel is extendable through the guide as the carrier is propelled away from the first support.

25. The weldment holder and manipulator of claim 24 wherein the guide means is resiliently carried by the second support.

26. The weldment holder and manipulator of claim 24 and including at least one rail extending between the first and second supports for guiding the carriage in its horizontal movement in the longitudinal direction.

27. The weldment holder and manipulator of claim 24 wherein the means for propelling the carriage includes a lead screw extending generally between the first and second supports, and the carriage includes a nut member engageable with the lead screw, and the power means includes means for establishing relative rotation between the lead screw and the nut member so that the carriage is propelled in the longitudinal direction.

28. The weldment holder and manipulator of claim 24 and including a third support longitudinally spaced from the second support, and including a mandrel receiving means facing towards the first support and freely rotatably about the longitudinal axis and engageable by the free end of the mandrel when the carriage holding the mandrel is propelled towards the third support so as to provide additional support for the mandrel.

29. A system for facilitating the welding of a thin walled attachment to outside surfaces of a thin walled hollow member at a plurality of welded joints, said member having an elongated cavity defined by a plurality of elongated internal wall surfaces and having at least one open end, comprising:
  (a) a mandrel carrier for receiving and supporting an end of a mandrel, the carrier being supported for movement in a longitudinal direction;
  (b) means for supporting the hollow member so that its elongated cavity extends in the longitudinal direction;
  (c) an elongated expandable mandrel supported at one end by the carrier in substantially cantilever fashion and extending in the longitudinal direction and having a free end opposite from the supported end; and
  (d) means for advancing the carrier with the mandrel in the longitudinal direction so that the free end of the mandrel passes through the at least one open end and enters the cavity of the thin walled hollow member;
  (e) means for welding, disposed adjacent the means for supporting the hollow member, for making welded joints between the thin walled attachment and the hollow member.

30. The system of claim 29 wherein the welding means includes means for welding using the gas metal arc process.

31. The system of claim 29 wherein the welding means includes means for welding using the gas tungsten arc process.

32. The system of claim 29 wherein the welding means includes a welding gun and robotic means for controlling said gun.

* * * * *